United States Patent [19]
Bielfeldt et al.

[11] Patent Number: 5,942,079
[45] Date of Patent: Aug. 24, 1999

[54] APPARATUS FOR THE CONTINUOUS ASSEMBLY AND GLUING OF VENEER PANELS TO FORM VENEER LAMINATES

[75] Inventors: Friedrich B. Bielfeldt, Pahl; Werner Hoffmann, Eppingen; Gerhard Melzer, Lautertal, all of Germany

[73] Assignee: Mashinenfabrik J. Dieffenbacher GmbH & Co., Eppingen, Germany

[21] Appl. No.: 09/136,455

[22] Filed: Aug. 19, 1998

Related U.S. Application Data

[62] Division of application No. 08/838,669, Apr. 9, 1997.

[30] Foreign Application Priority Data

Jul. 4, 1996 [DE] Germany ............................ 196 27 024

[51] Int. Cl.$^6$ ..................................................... B65H 29/66
[52] U.S. Cl. ........................ 156/379.8; 156/556; 156/558; 156/580
[58] Field of Search ..................................... 156/264, 266, 156/304.1, 556, 558, 559, 563, 566, 569, 580, 379.6, 379.8, 380.9

[56] References Cited

U.S. PATENT DOCUMENTS 3,841,945 10/1974 Troutner et al. .
3,963,552 6/1976 Troutner et al. .
4,507,162 3/1985 Iwamoto .

FOREIGN PATENT DOCUMENTS 23 18 284 4/1973 Germany .
43 32 186 9/1993 Germany .

*Primary Examiner*—Sam Chuan Yao
*Attorney, Agent, or Firm*—Foley & Lardner

[57] ABSTRACT

Veneer panels which are to be joined in a plurality of layers one above the other and one behind the other are assembled and glued to form an endless strand of veneer laminates. In the process, the veneer panels are first fed in through a glue-application machine which applies a layer of glue on a top side of the veneer panels onto a buffer belt. The veneer panels are then transferred from the buffer belt to a horizontally reversing feed belt which forms on a roller table a first veneer assembly comprising a plurality of veneer panels. The first veneer assembly is raised about its front end by an angle α into an oblique position so that veneer panels of a subsequent veneer assembly can be threaded into the first veneer assembly using the horizontally reversing feed belt. The first and subsequent veneer assemblies are thereby combined into a veneer-panel strand, and transferred to a continuously operating prepress and press.

11 Claims, 8 Drawing Sheets

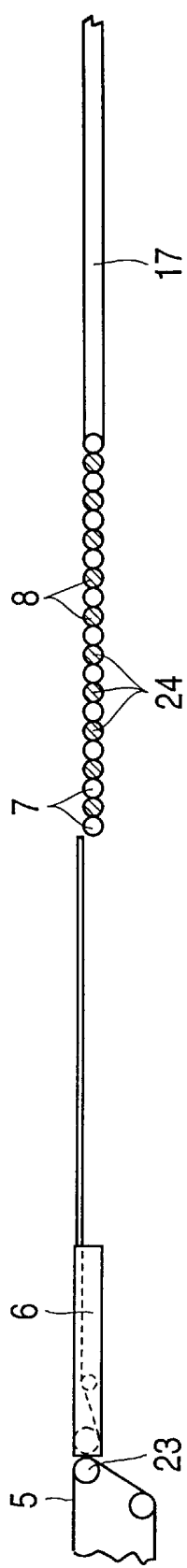
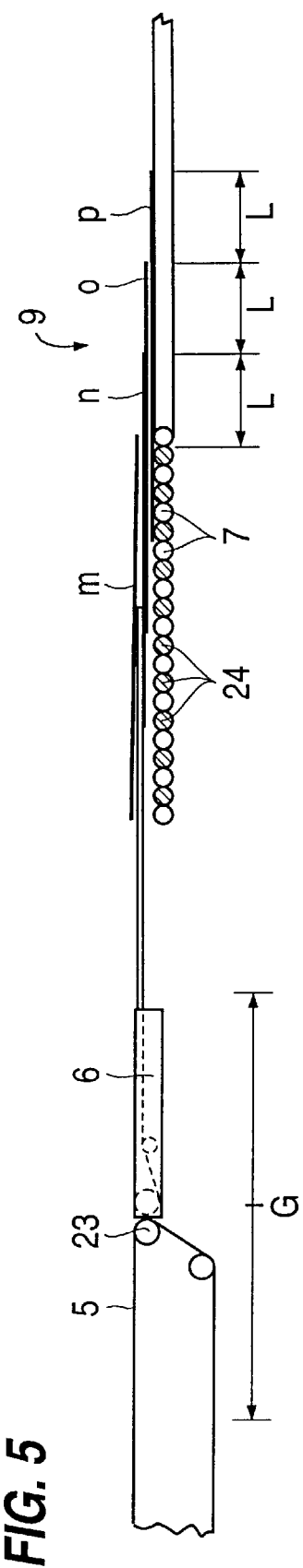
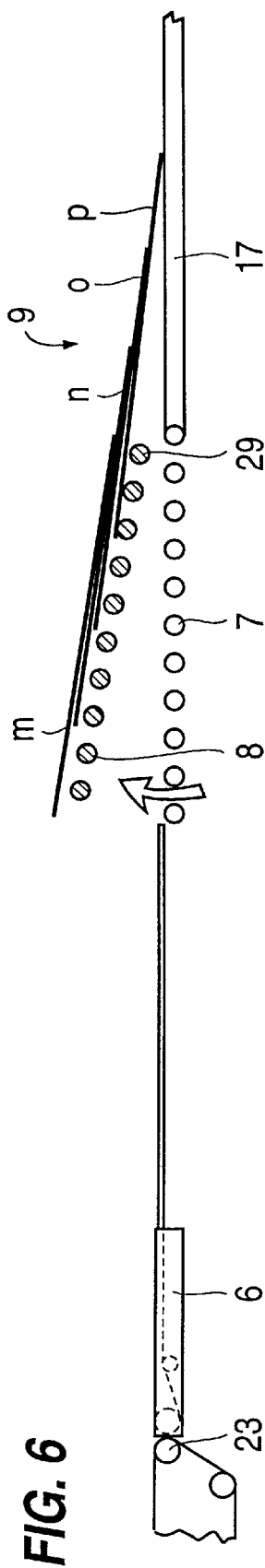

APPARATUS FOR THE CONTINUOUS ASSEMBLY AND GLUING OF VENEER PANELS TO FORM VENEER LAMINATES

This application is a divisional of application Ser. No. 08/838,669, filed Apr. 9, 1997.

BACKGROUND OF THE INVENTION

1. Field of the Invention

The invention relates to a process for assembling and gluing veneer panels which are to be joined in a plurality of layers one above the other and one behind the other to form an endless strand of veneer laminates, and to a plant for carrying out the process.

2. Description of the Related Art

An apparatus for feeding continuously operating composite presses, which the invention takes as its starting point, has been disclosed in German Offenlegungsschrift 2,318,284 (corresponding to U.S. Pat. No. 3,841,945 and U.S. Pat. No. 3,963,552). This disclosure does not provide a solution to the problem of automatic laying of veneer assemblies and continuous feeding of these veneer assemblies into a continuously operating press.

SUMMARY OF THE INVENTION

An object of the invention is to provide a process by means of which it is possible to automatically and continuously combine assemblies of large-area veneer panels (or sheets) with sufficient mechanical linking so that, in the subsequent continuous pressing operation, these veneer-panel transitions have virtually the same physical strength properties as the standard pressed veneer assembly joined together in a sandwich construction.

Another object of the invention is to provide a plant for carrying out the process according to the invention.

The above and other objects of the invention are accomplished by the steps of: feeding the veneer panels through a glue-application machine which applies a layer of glue on a top side of the veneer panels onto a buffer belt; transferring the veneer panels from the buffer belt to a horizontally reversing feed belt which forms on a roller table a first veneer assembly comprising a plurality of veneer panels; raising the first veneer assembly about its front end by an angle α into an oblique position; and threading veneer panels of a subsequent veneer assembly into the first veneer assembly using the horizontally reversing feed belt, the first and subsequent veneer assemblies being combined into a veneer-panel strand, and are passed on to a central transfer belt.

The plant according to the invention includes a glue-application machine for applying a layer of glue on a top side of the veneer panels, a roller table, and a horizontally reversible belt system transferring the veneer panels from the glue-application machine to the roller table to form a veneer assembly, wherein the horizontally reversible belt system threads in additional veneer panels into the veneer assembly to form a veneer-panel strand.

Advantages of the process and the plant according to the invention reside in the mechanical linking of the respective ends and starts of the veneer panels in the threading-in position. Such a mechanical linking is accomplished by means of numerically controlled synchronous control between the outgoing veneer assembly and the incoming veneer panel, which allows a veneer overlap Y to be formed for each veneer layer. This process is assisted by fixing of the veneer panels that are fed in. The fixing is likewise subject to the pressing speed of the continuously operating press.

The continuous laying of the veneer panels to form veneer assemblies with the veneer overlap Y is performed by means of the continual reversing stroke, and, under numerical control, the same geometrical overlap spacing in the threading-in position is ensured in all cases. The pressing speed of the continuously operating press can be further increased by means of the preheating or additional heating systems employing UHF heating, i.e. microwave heating, in the prepress and in the forward part of the continuously operating press immediately following the run-in region.

The setting time of the glue layers in the continuously operating press also determines the time frequencies of the automatic laying of the veneer assemblies. These time frequencies are also bounded by the reversing-stroke speed of the buffer belt and of the feed belt, thus making it possible, in an advantageous manner, by means of the multi-level arrangement of the plant, to adapt the operating speed of the levels to the overall production rate of the continuously operating press in that the veneer-panel strands produced in each level are brought together to form a common double veneer panel strand, a two-level solution to the veneer-panel thicknesses required in practice.

The entire automatic laying operation is numerically controlled and also controlled in such a way that, in all cases, the upper sides of the veneer panels are glued, except for the uppermost veneer panel of the assembly, which passes unglued through the gluing device since the gluing unit is correspondingly released. In order to ensure gluing to the next veneer panel assembly, the uppermost veneer panel is glued at the rear edge by a separate gluing station.

The pressing speeds, i.e. the production rate, is advantageously accomplished by means of additional heating systems, for example, an integrated preheating system in the run-in roller frame and an additional heating system in the continuously operating press using microwaves.

Tests have furthermore shown that, where rolling support is provided in the continuously operating press, for example, by means of rolling rods with a diameter of 21 mm and a rolling-rod spacing of 1.5 mm with steel-belt thicknesses $\geq 2.7$ mm, it is possible to manufacture veneer laminates satisfactorily. This means that the production of such veneer laminates from one of the veneer-panel strands produced continuously in accordance with the invention is possible without difficulty.

BRIEF DESCRIPTION OF THE DRAWINGS

Further features and advantages of the invention will emerge from the claims and from the description of an exemplary embodiment with reference to the drawings, in which:

FIGS. 4 to 9 show schematically the continuous production of a double strand of veneer assemblies or the production of an endless strand of veneer laminates;

The accompanying drawings which are incorporated in and constitute a part of the specification, illustrate presently preferred exemplary embodiments of the invention, and, together with the general description given above and the detailed description of the preferred embodiment given below, serve to explain the principles of the invention.

DETAILED DESCRIPTION OF THE PREFERRED EMBODIMENT

Figure 1:
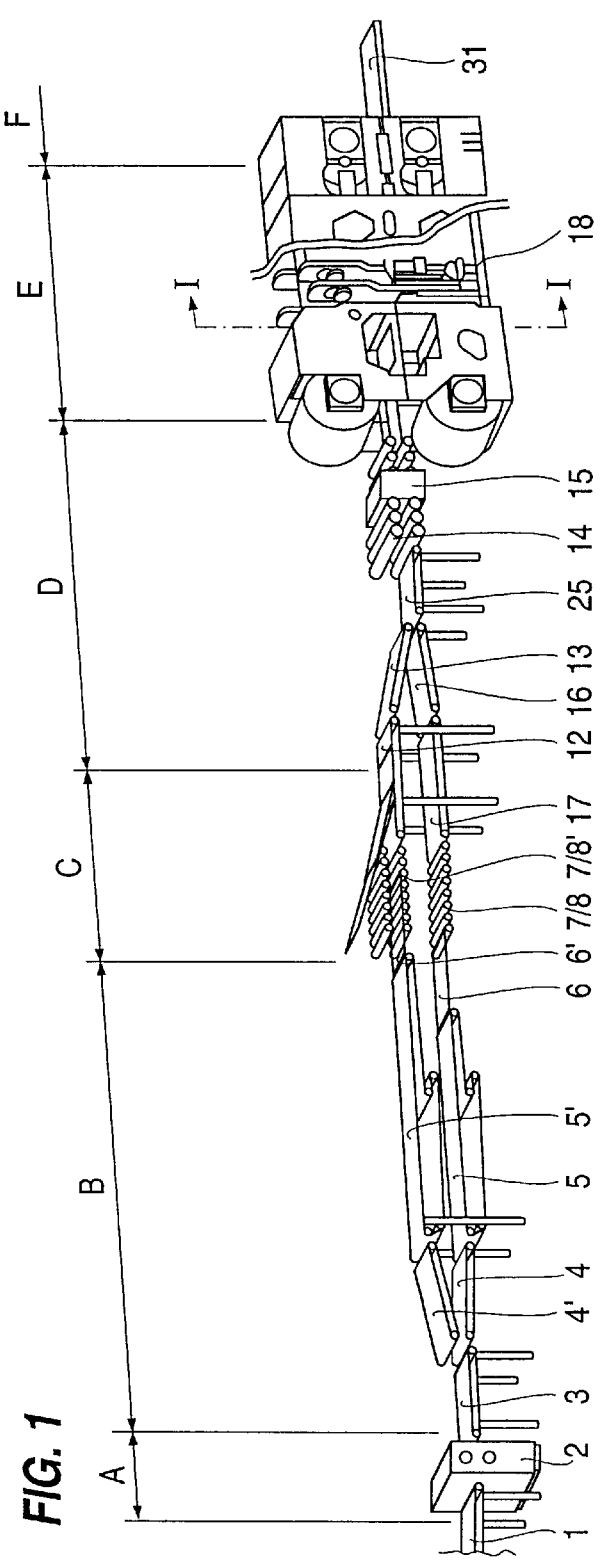
FIG. 1 shows a side view of the plant for carrying out the process according to the invention.

FIG. 1 shows, in an overall perspective view, the plant for carrying out the process according to the invention. Following the division of the plant according to FIG. 1, the plant sections are as follows:

A Veneer-gluing device

B Double-level feedbelt system

C Veneer-panel laying and interlinking device

D Double-strand system of veneer assemblies

E Continuously operating press with additional microwave heating system

F Veneer laminate

Plant Section A:

According to FIG. 1, the veneer panels 1 comprise veneer sheets with a thickness of, for example, 2.5 mm to about 4.6 mm and dimensions of, for example, 4'×8' or 3'×6', are fed in at high speed through the gluing device 2, and then are transferred to the transfer belt 3. Only the upper side of the veneer panel 1 is glued, permitting good transportability on the belts and roller tables over the entire plant section B and the plant section E. Only the uppermost veneer panel m of a veneer assembly 9, 10 or 11 is not glued. Adhesion is in each case provided by the veneer panel n situated underneath.

The layer structure is numbered as it passes through sections A, B and C, the veneer panels 1 being correspondingly counted (numbered) in the feed to the gluing device 2. The multi-level belt distributor 4 is controlled accordingly.

Plant Section B:

The feeding of the veneer panels 1 into the veneer-panel laying and interlinking device C can be seen from FIGS. 1, 4, 5, 6, 7, 8, 9, 11, 12, 13, 14 and 15. The glued and unglued veneer panels 1 are fed by the transfer belt 3 to the multi-level belt distributor 4. The latter comprises two pivotable belts for receiving the veneer panels 1. The upper, pivotable multi-level belt distributor 4' on the upper level runs upwards and the lower pivotable multi-level belt distributor 4 for the lower level runs downwards.

The veneer panels 1 are each received by the buffer belts 5 and 5' of the upper and lower levels and fed to the feed belts 6 and 6' in the region of the transfer projection 22 at the top and 23 at the bottom. Buffer belt 5 and feed belt 6 synchronously perform the transfer and the laying function, respectively, by means of a reversible horizontal stroke motion.

Figure 16:
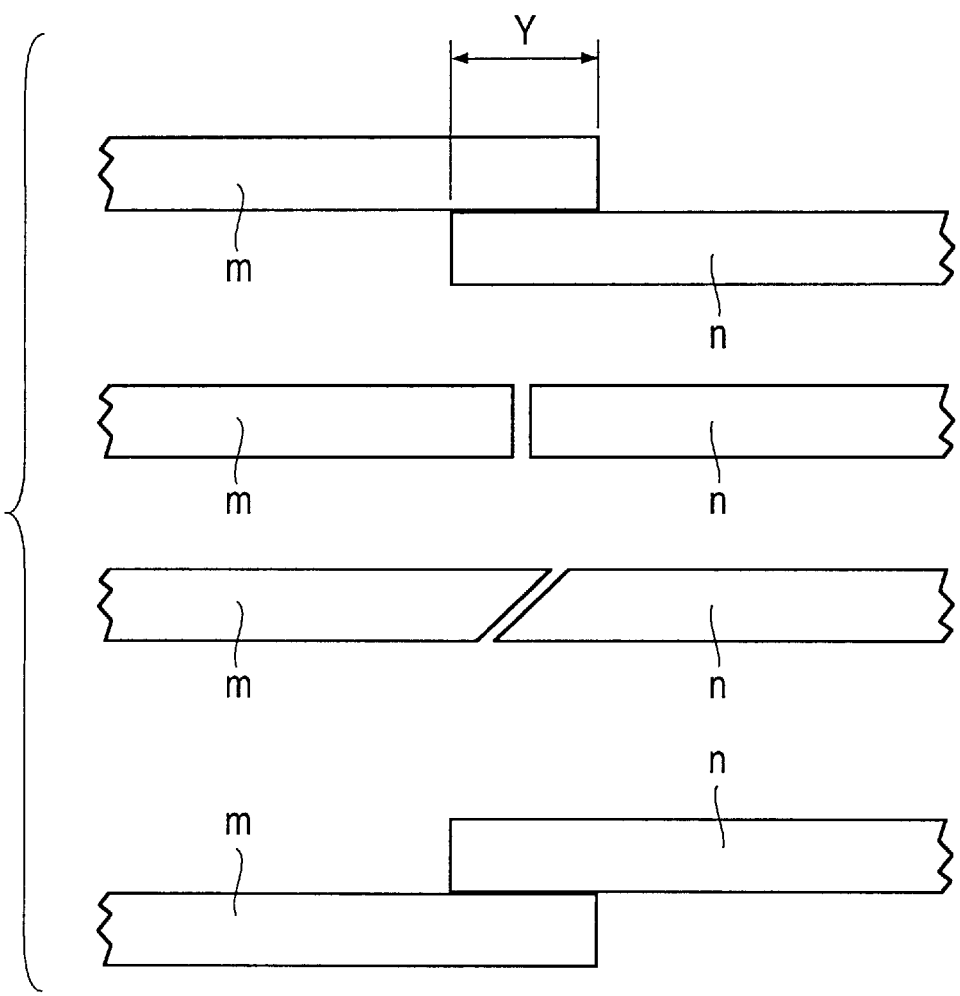
FIG. 16 shows various possible ways of joining the veneer assembly.

Depending on the laying program (abutment or overlap as shown in FIG. 16), the veneer panel 1 can, in the course of the forward movement, be transported in the direction of the threading-in position 19 and positioned or carried to the threading-in position 19 having already been positioned on the feed belts 6 and 6'. During the discharge process, the next veneer panel 1 is received by the combined buffer and feed belt system 5 and 6 as they move back, in order to ensure a short cycle time. For this purpose, the belt drives of the belt systems are applied under program control with various speeds, in some cases continuously and/or intermittently.

Figure 10:
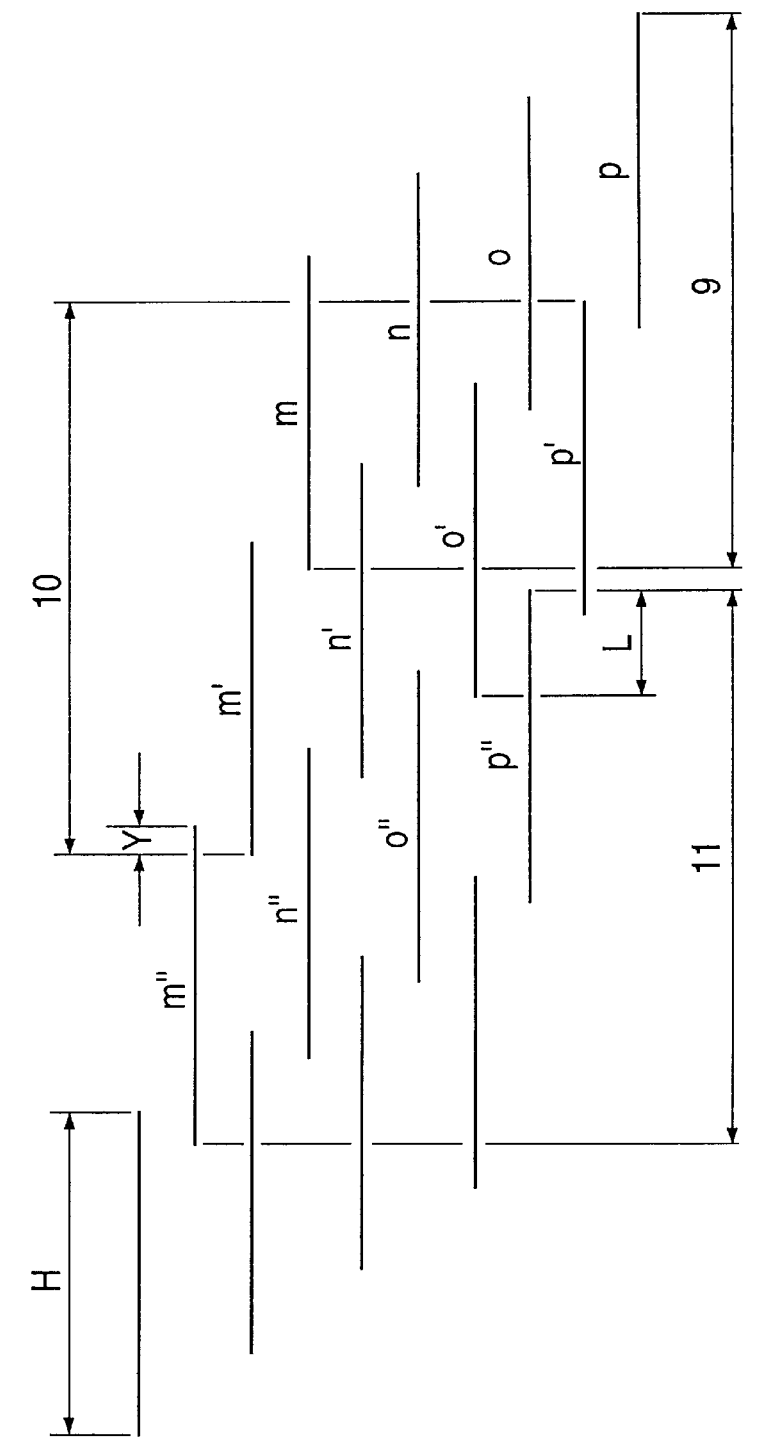
FIG. 10 shows the structure of the veneer assembly with a veneer-panel length H, a veneer projection L, and a veneer overlap Y.

Plant Section C:

According to FIGS. 1 to 15, the individual veneer panels 1 are, in the threading-in position 19, bonded mechanically by means of the veneer overlap y to the corresponding veneer panels m, n, o and p of a veneer assembly 9, 10 or 11. The continuous linking or interlinking of the respective veneer panels m, n, o and p of, for example, one veneer assembly 9 with that of the veneer assembly 10 to form a continuous veneer-panel strand 20 or 21, is described below. FIG. 10 shows the linked or threaded structure of a number of veneer assemblies 9, 10 and 11 to form a veneer-panel strand 20 or 21.

The veneer-panel laying and interlinking device C shown in FIG. 4 includes the buffer belt 5 which brings the veneer panels 1 in, the feed belt 6, the driven roller table 7 and the driven veneer placement roller table 8, the last transfer roller 29 with the threading-in position 19, and the run-on belt 17, which transports the veneer-panel strand 21 formed by layers of veneer panels 1 onwards.

FIGS. 5 to 9 show the first veneer assembly 9, assembled with veneer projection L. Here, the veneer panels p, o, n and m are placed one on top of the other in this sequence on roller table 7 and the veneer placement roller table 8 by the feed belt 6, in each case set back by the amount L, with the veneer projection L. The feed belt 6 has in the process moved back with the buffer belt 5 by the reversing distance G into its starting position shown in FIG. 6. As FIG. 6 shows, the veneer assembly 9 is pivoted upwards, with its front end as the pivot, from the stationary roller table 7 at the angle α by means of the veneer placement roller table 8.

It is evident from FIGS. 7 to 9, 11 and 12 how the threading-in operation proceeds. With a constant speed of operation, the first veneer panel p has fallen (dropped) from the last transfer roller 29 of the veneer placement roller table 8 on to the run-on belt 17 and hence is moving onwards. In the meantime, the feed belt 6 has moved in over the roller table 7 with the first veneer panel p' of the next veneer assembly 10 to be threaded in, and lays this veneer panel p' with the veneer overlap y on to the veneer panel p ahead of it. After the reverse movement, simultaneously depositing the veneer panel p', the feed belt 6 moves forward again and, continually reversing, lays or threads in the next veneer panels o', n' and m' according to FIGS. 11 and 12, with the spacing y on the corresponding veneer panels o, n and m ahead of them, in each case after the latter have dropped from the last transfer roller 29, and, in the process, forms the next veneer assembly 10 on the stationary roller table 7 in accordance with FIG. 12.

Figure 11:
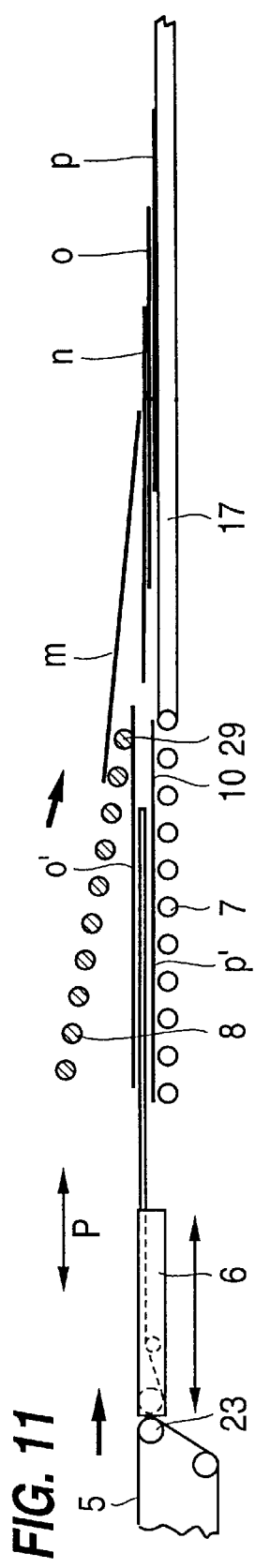
FIGS. 11 and 12 show schematically details in the sequence of motions in the veneer-panel laying and interlinking device.
Figure 15:
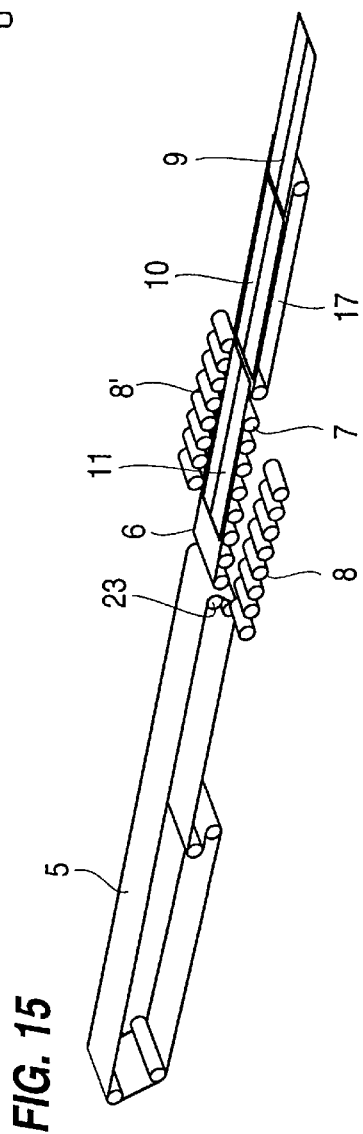

FIG. 11 furthermore shows the rear end of the upper veneer panel m of veneer assembly 9 sliding off the upper transfer roller 29. The centrally split veneer placement rollers of the pivotable veneer placement roller table 8, which are capable of being retracted and extended at the side, are then immediately, as shown in FIG. 15, extended at the side and pivoted into the horizontal lower position by the pivoting angle α and then immediately retracted into the supporting position 24 between the rollers of the stationary roller table 7.

Figure 12:
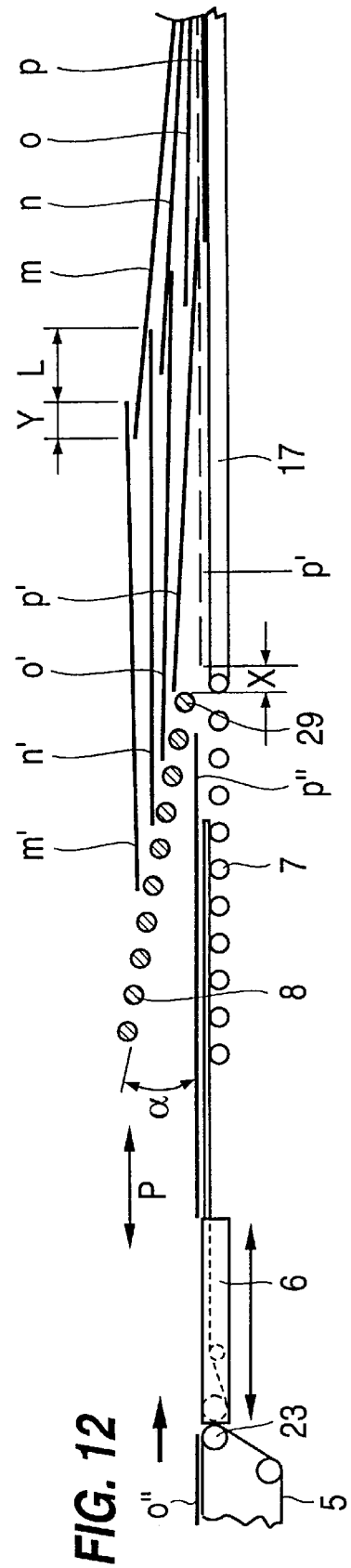

As FIG. 12 shows, the following veneer assembly 10 is then immediately afterwards raised by the angle α, i.e., pivoted in, so that, as the veneer assembly 10 runs off at the pressing speed, the veneer panels 1 are, in accordance with FIGS. 4 to 9, fed in by means of the combined buffer and feed belt system 5 and 6 and transferred into the outgoing veneer assembly 10 to form the veneer assembly 11. During the transfer of the veneer panels 1 by the feed belt 6, the front edge is in each case laid on the rear edge of the last outgoing veneer assembly which has previously run off from the veneer placement roller table 8 (see FIGS. 4 to 15).

Roller table 7 and the veneer placement roller table 8 (or, if appropriate, just the last transfer roller 29) are driven at the same speed of the continuously operating press 18. By means of the steady operating speed and the identical geometrical positions of H relative to L and Y, the same veneer-assembly situation is always obtained, i.e., the fixing of the veneer panels 1 relative to one another in the assembly strand.

The threading-in position is a result of the vertical line of drop from the last transfer roller 29 plus the position spacing X which results from the speed of travel, the latter being equal to the pressing speed. In FIG. 12, this position spacing X is drawn in (in broken lines) for the veneer panel p', which has already fallen down. This threading-in position 19 is sensed by means of a light barrier for each veneer panel which has fallen down and is thus the reference point for the deposition of the veneer panels of the following veneer assembly 10. In this way, differences due to tolerances in the length H of the veneer panels 1 are automatically compensated for. This means that the belt speeds and the reversing speeds of the buffer and feed belts 5 and 6 depend, in accordance with the NC axes of their drives, on the reference signal with respect to the position spacing X in the threading-in position 19. The distance from one overlapping joint to the next overlapping joint is selectable or can, for example, be determined as a product of the length H from the number of veneer panels 1.

It should be noted that, as shown in FIG. 16, other joint configurations are also possible with the plant according to the invention. During the transfer operation, the outgoing veneer assembly moves at a continuous pressing speed. During the deposition operation, the veneer panel 1 to be deposited is fixed in its position. This fixing is likewise performed at a continuous pressing speed. The bringing together of the veneer-panel strands 20 and 21 from the two levels is likewise performed with a selectable spacing of the overlapping joints.

Figure 13:
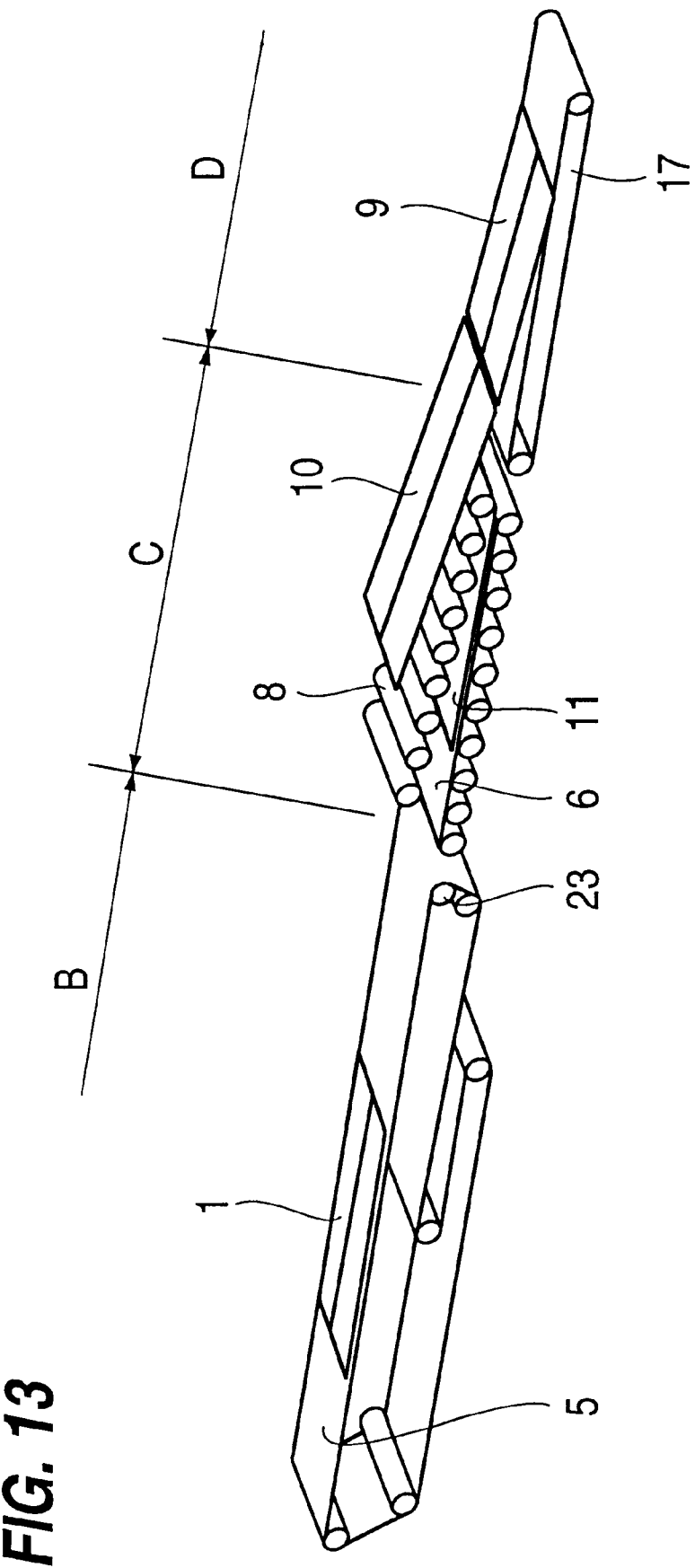
FIGS. 13, 14 and 15 show, in a perspective view, various operating positions of the double-level feed-belt system, the veneer-panel laying and interlinking device, and the double-strand system.
Figure 14:
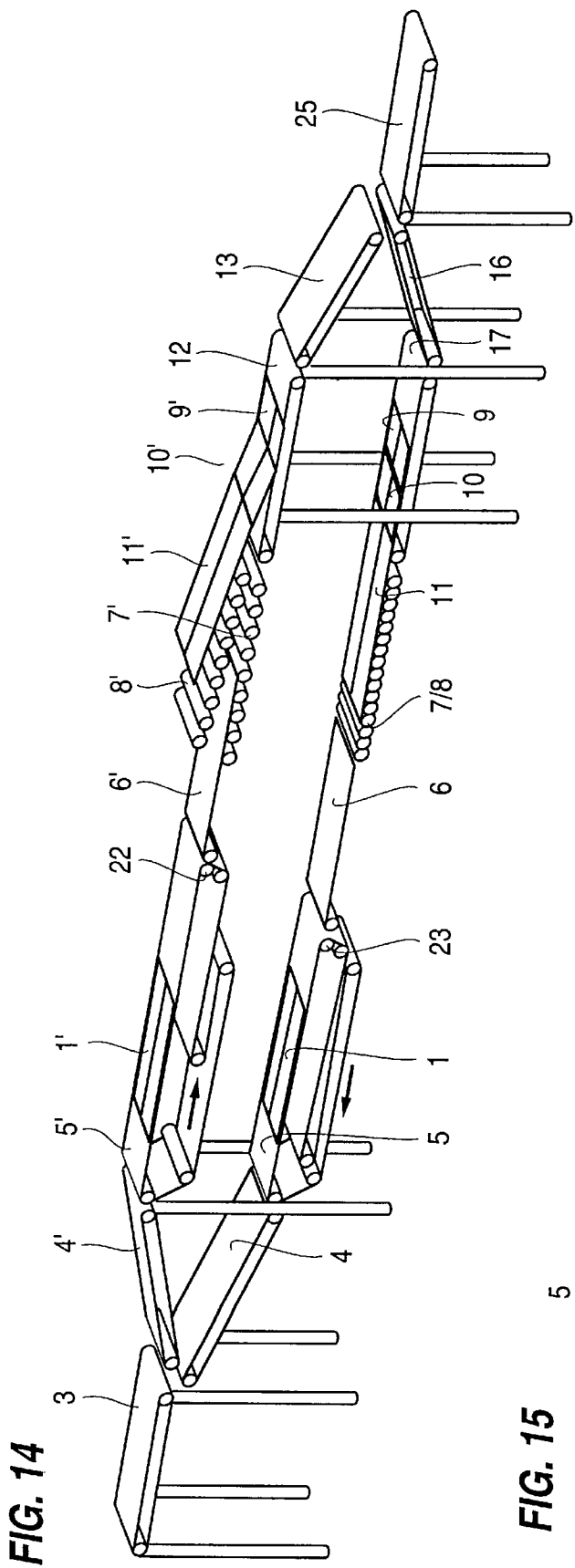

It should also be noted that the veneer-panel laying and interlinking device can be embodied with either one level or with a number of levels. FIGS. 13, 14 and 15 illustrate in perspective representation the laying and joining operation described above.

Figure 3:
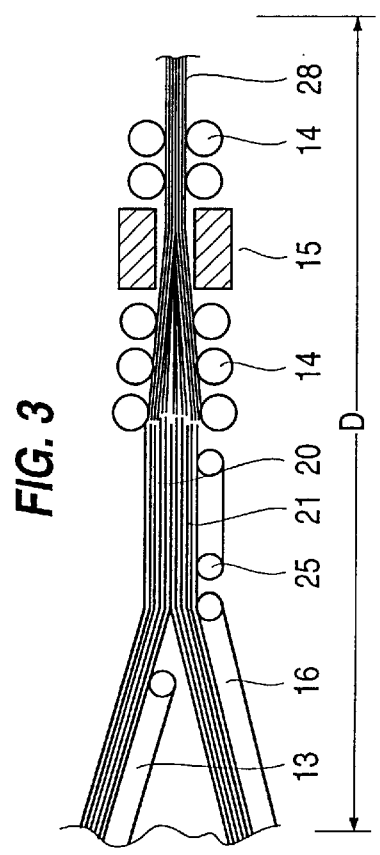
FIG. 3 is a cross-sectional view taken along line I—I of FIG. 1 and shows the front region of the continuously operating press with an additional microwave heating system arranged on the longitudinal side.
Figure 7:
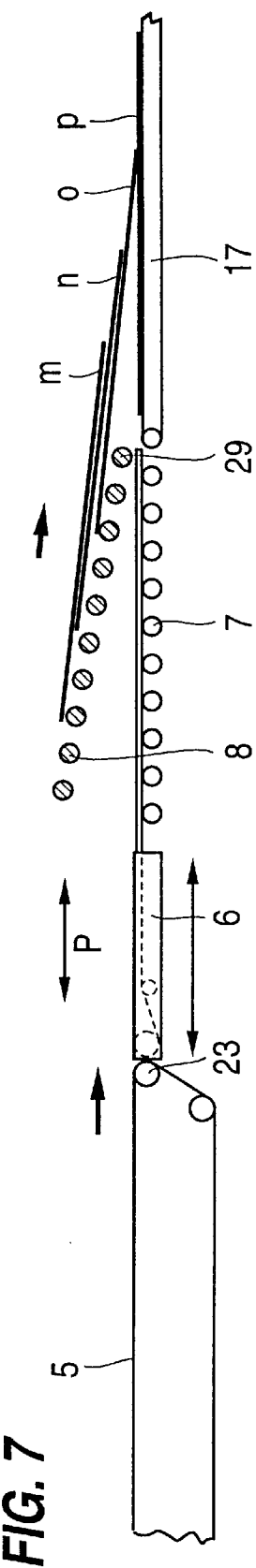
Figure 8:
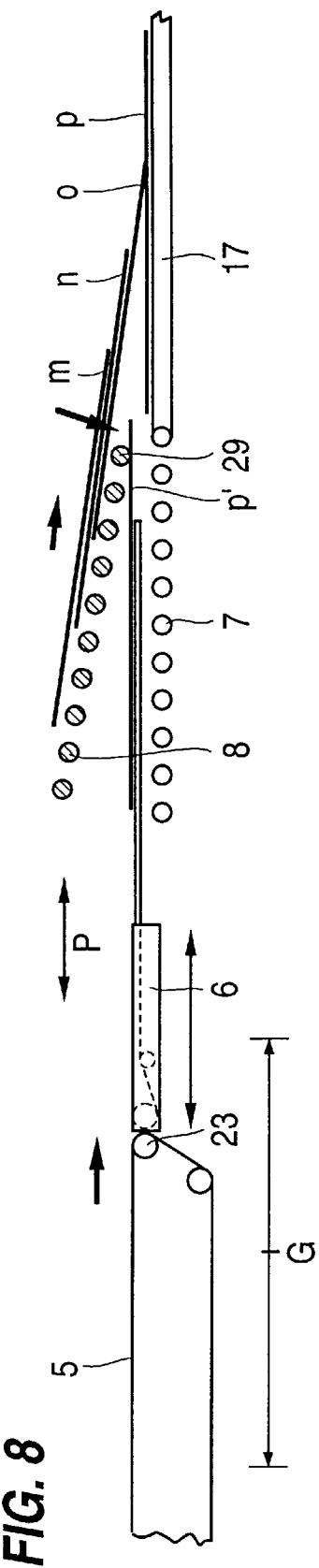
Figure 9:
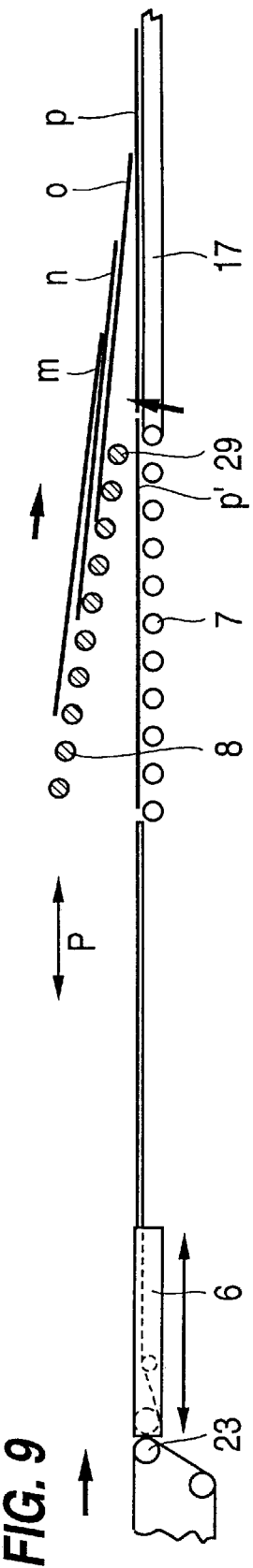

Plant Section D:

The continuously formed veneer-panel strands 20 and 21 of the upper and lower level are received by the run-on belt 12 (at the top) and 17 (at the bottom) and fed to the central transfer belt 25 via obliquely running laying belts 13 (at the top) and 16 (at the bottom). FIG. 3 shows, in a longitudinal section, how the double veneer-panel strand 28 is formed from the two levels at the top and bottom and fed in by means of the central transfer belt 25 of the run-in roller frame with prepress 14.

The prepress 14 comprises a run-in roller frame with an integrated preheating system 15, which can, for example, be formed by a UHF or microwave field, which may be arranged within or, alternatively, outside the run-in roller frame. Depending on what circumstances are decisive for the product to be produced, for example, thickness or type of wood of the veneer panels, the plant can be selectively embodied with or without a run-in roller frame with a prepress 14 and with or without a preheating system. Any desired combination is possible.

Figure 2:
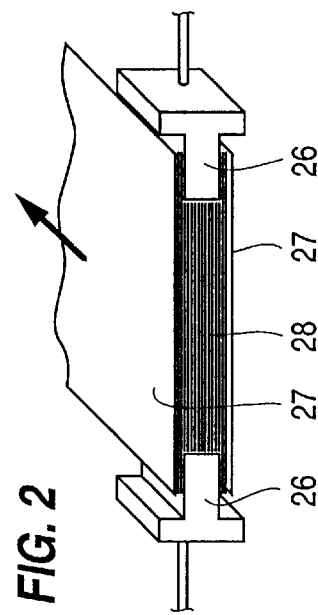
FIG. 2 shows, in an enlarged scale, a double strand of veneer assemblies with prepress and preheating.

Plant Section E:

The upper and lower revolving steel belts 27 of the continuously operating press 18 are supported relative to heated press heating plates by means of rolling rods. In FIG. 2, the Section I—I shows an optional additional arrangement of a UHF (/microwave) heating device 26 for the purpose of increasing the production rate. In other words, production can be increased by using a preheating system 15 as shown in FIG. 3 or the UHF (/microwave) heating device 26 within the continuously operating press 18 or, alternatively, a combination.

Plant Section F:

After leaving the continuously operating press 18, the veneer laminate 31, emerging continuously and endlessly, is fed to a finishing system, i.e., the endless veneer laminate 31 is divided up into appropriate construction elements, beams and supporting elements for prefabricated house construction. Preferably and expediently, the rule used for calculation in the design of the continuously operating press 18 is that, having regard to rolling rods with a thickness (diameter) of D=21 mm and a rolling-rod spacing of S=1.5 mm (during the pass through the pressing region), steel belts with a thickness of d=2.7 mm, preferably 3 mm, are used with a specific pressing force of $2^N/mm^2$.

While a particular embodiment according to the invention has been illustrated and described above, it will be clear that the invention can take a variety of forms and embodiments within the scope of the appended claims.

The disclosure of the priority document, German patent application 196 27 024.3 filed Jul. 4, 1996, is hereby incorporated by reference in its entirety.

We claim:

1. An apparatus for assembling and gluing veneer panels which are to be joined in a plurality of layers one above the other and one behind the other to form an endless strand of veneer laminates, comprising:

a glue-application machine for applying a layer of glue on a top side of the veneer panels;

a roller table including a stationary roller table and a veneer placement roller table, wherein the veneer placement roller table is pivotable by a predetermined angle into an oblique position; and a horizontally reversible belt system for transferring the veneer panels from the glue-application machine to the roller table to form a veneer assembly, the horizontally reversible belt system threading in additional veneer panels into the veneer assembly to form a veneer-panel strand.

2. The apparatus as claimed in claim 1, further comprising:

a continuously operating prepress with a heating system; and a central transfer belt for transferring the veneer-panel strand to the continuously operating prepress.

3. The apparatus as claimed in claim 2, wherein the heating system of the continuously operating prepress comprises a UHF heating system.

4. The apparatus as claimed in claim 2, further comprising a continuously operating press receiving the veneer-panel strand from the continuously operating prepress.

5. The apparatus as claimed in claim 4, wherein the continuously operating press comprises an additional heating system for pressing and gluing.

6. The apparatus as claimed in claim 1, wherein the stationary roller table includes a plurality of stationary rollers, wherein the veneer placement roller table includes a plurality of placement rollers, wherein the stationary rollers are interspersed between the placement rollers, and wherein the placement rollers can be raised collectively when the additional veneer panels are threaded into the veneer assembly.

7. The apparatus as claimed in claim 6, wherein the veneer panels of the veneer assembly partially overlap each other by a predetermined overlap distance which is numerically controlled by a reversing stroke horizontal reversible belt system.

8. An apparatus for assembling and gluing veneer panels which are to be joined in a plurality of layers one above the other and one behind the other to form an endless strand of veneer laminates, comprising:

a glue-application machine for applying a layer of glue on a top side of the veneer panels;

upper and lower roller tables, each roller table including a stationary roller table and a veneer placement roller table, wherein the veneer placement roller table is pivotable by a predetermined angle into an oblique position; and a horizontally reversible belt system, including upper and lower belts, for alternately transferring the veneer panels from the glue-application machine to the upper and lower roller tables to form upper and lower veneer assemblies, the horizontally reversible belt system threading in additional veneer panels into the upper and lower veneer assemblies to form upper and lower veneer-panel strands.

9. The apparatus as claimed in claim 8, further comprising a central transfer belt on which the upper and lower veneer-panel strands are brought together to form a double veneer-panel strand.

10. The apparatus as claimed in claim 9, further comprising a continuously operating prepress with a heating system to which the central transfer belt supplies the double veneer-panel strand.

11. The apparatus as claimed in claim 10, further comprising a continuously operating press receiving the double veneer-panel strand from the continuously operating prepress.

* * * * *